(12) United States Patent
Chludek et al.

(10) Patent No.: US 9,074,641 B2
(45) Date of Patent: Jul. 7, 2015

(54) AXIAL SETTING DEVICE WITH LINEAR DRIVING MECHANISM

(75) Inventors: Adrian Chludek, St. Augustin (DE);
Mark Schmidt, Koenigswinter (DE);
Andreas Baer, St. Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 406 days.

(21) Appl. No.: 12/996,482

(22) PCT Filed: Jun. 5, 2009

(86) PCT No.: PCT/EP2009/004053
§ 371 (c)(1),
(2), (4) Date: Dec. 6, 2010

(87) PCT Pub. No.: WO2009/146931
PCT Pub. Date: Dec. 10, 2009

(65) Prior Publication Data
US 2011/0073431 A1    Mar. 31, 2011

(30) Foreign Application Priority Data
Jun. 5, 2008  (DE) .......................... 10 2008 026 902

(51) Int. Cl.
*F16D 25/08*  (2006.01)
*F16D 23/12*  (2006.01)

(52) U.S. Cl.
CPC .......... *F16D 23/12* (2013.01); *F16D 2023/123* (2013.01)

(58) Field of Classification Search
CPC .................................. F16D 25/08; F16D 43/28
USPC .......... 192/66.32, 70.23, 70.28, 70.29, 85.47, 192/93 A
See application file for complete search history.

(56) References Cited

U.S. PATENT DOCUMENTS 1,045,688 A    11/1912  Ellett
4,121,696 A *  10/1978  Margetts ...................... 188/71.3
(Continued)

FOREIGN PATENT DOCUMENTS

AT    4635 U1    9/2001
DE    31220 A    10/1964
(Continued)

OTHER PUBLICATIONS

PCT International Seach Report for PCT/EP2009/004053 dated Oct. 6, 2009.
(Continued)

*Primary Examiner* — Rodney H Bonck
*Assistant Examiner* — Stacy Fluhart
(74) *Attorney, Agent, or Firm* — Bejin Bieneman PLC (57) ABSTRACT

The disclosure relates to a coupling assembly for connecting an optionally drivable secondary driveline to a permanently driven primary driveline, comprising a friction coupling and an axial setting device. The friction coupling has a first coupling part and a second coupling part which are rotatable around an axis of rotation A and which, by axial forces, can be coupled to one another for transmitting torque. The axial setting device is configured for actuating the friction coupling, wherein the axial setting device comprises a first ring which is at least indirectly axially supported relative to a fixed component and a second ring which is supported at least indirectly relative to the first ring and which, when at least one of the first and second rings; is rotated around the axis A, is axially displaceable, wherein, for rotating the at least one of the first and second rings there is provided a linear driving mechanism.

22 Claims, 7 Drawing Sheets

(56) References Cited

U.S. PATENT DOCUMENTS

| | | | |
|---|---|---|---|
| 5,080,640 | A | 1/1992 | Botterill |
| 5,934,433 | A | 8/1999 | Leimbach et al. |
| 6,006,883 | A | 12/1999 | Husse et al. |
| 6,578,693 | B2 | 6/2003 | Mayr |
| 6,702,084 | B2 | 3/2004 | Grosspietsch et al. |
| 7,448,978 | B2 | 11/2008 | Habel |
| 7,789,205 | B2 | 9/2010 | Iraschko |
| 7,806,797 | B2 | 10/2010 | Gassmann et al. |
| 2003/0029690 | A1* | 2/2003 | Reisinger .................. 192/84.7 |
| 2005/0167229 | A1* | 8/2005 | Tsukada et al. ............ 192/54.52 |
| 2006/0283683 | A1* | 12/2006 | Miller ........................ 192/85 C |
| 2007/0137970 | A1 | 6/2007 | Stefan et al. |
| 2007/0144860 | A1* | 6/2007 | Bowen et al. .............. 192/70.23 |

FOREIGN PATENT DOCUMENTS

| | | |
|---|---|---|
| DE | 36 17 074 A1 | 11/1987 |
| DE | 195 37 718 A1 | 4/1996 |
| GB | 694 722 A | 7/1953 |

OTHER PUBLICATIONS

Translation of International Preliminary Report on Patentability from PCT International Search Report for PCT/EP2009/004053 dated Dec. 6, 2010.

* cited by examiner

AXIAL SETTING DEVICE WITH LINEAR DRIVING MECHANISM

TECHNICAL FIELD

The disclosure generally relates to a coupling assembly for connecting a driving axle in the driveline of a motor vehicle, wherein the coupling assembly has an axial setting device which is designed in such a way that it can convert a rotational movement into an axial movement.

BACKGROUND

Coupling assemblies that convert rotation movement into an axial movement, can serve as so-called hang-on couplings for optionally driving an additional driving axle or as locking couplings at a transmission stage for the variable distribution of torque between two driving axles of a differential gear.

From DE 39 20 861 A1 there is known a mechanical axial setting device for actuating a friction coupling in a locking differential, which axial setting device is provided in the form of a ball ramp assembly. This prior art axial setting device comprises an axially fixed supporting ring and an axially displaceable setting ring of which one is rotatable relative to the other one. For rotating purposes, there is provided a rotary drive in the form of an electric motor which is able to drive the rotatable ring via a reduction stage.

DE 10 2005 053 555 B3 proposes a ball ramp assembly which is controlled by an electric motor and which serves to actuate a friction coupling in a differential gearbox with a variable torque distribution. In the axial setting devices of this type, actuation is effected by an electric motor which achieves a relative rotation of the two rings. The electric motor must have sufficiently large dimensions in order to provide the torque capacity required for rotational purposes, the result being that the electric motors require a great deal of space and in view of the so-called packaging, such that they may be difficult to be integrated into the unit which is actuated by the axial setting device.

From DE 103 49 030 A1 there is also known a hydraulic axial setting device with a pump and a piston for loading a friction coupling.

DE 10 2005 018 907 A1 proposes a differential gearbox with a disc brake for an electrically driven driving axle. The brake can be actuated via a ball ramp, and the rotation of a rotatable component of the ball ramp can be effected by a hydraulic cylinder.

From DE 36 17 074 A1 there is known an axle assembly for a motor vehicle which comprises a differential gear, a brake which acts on the half-shafts of the differential gear and a differential lock. Between the brake and the differential lock there is provided a common actuating device which is provided in the form of a ball ramp device and comprises two pressure plates. For rotating one of the two pressure plates relative to the other pressure plate, there is provided a hydraulic cylinder.

AT 004 635 U1 proposes a claw coupling for a lockable axial differential. The claw coupling is actuated by an actuating device comprising two rings of which one is rotatable relative to the other one. For rotating the first ring relative to the second ring, there is provided an actuator provided in form of a solenoid.

SUMMARY

A coupling assembly for connecting a driving axle with an axial setting device which is designed in such a way that it can convert a rotational movement into an axial movement and which is suitable for generating high torque values and thus high axial forces is desired. It is also desired that an axial setting device should have a simple construction and should be suitable for being easily integrated into a coupling assembly, more particularly into the driveline of a motor vehicle.

The disclosure herein describes a coupling assembly for connecting an optionally drivable secondary driveline to a permanently driven primary driveline, comprising a friction coupling with a first coupling part and a second coupling part which are rotatable around an axis of rotation and which, by effecting axial forces, can be coupled to one another for transmitting torque; as well as an axial setting device for actuating the friction coupling, wherein the axial setting device comprises a first ring which is at least indirectly axially supported relative to a fixed component, and a second ring which is supported at least indirectly relative to the first ring and which, when at least one of the two rings is rotated, is axially displaceable around an axis A, wherein, for rotating the at least one of the two rings, there is provided a linear driving mechanism.

The linear driving mechanism is advantageous in that it generates relatively high forces which are converted into high torque values at the axial setting device. This also means that the axial forces generated by the axial setting device by rotating the one ring relative to the other ring are increased so that there is available a high locking moment for loading the friction coupling. As a result, the coupling assembly is particularly suitable for those applications where high locking moments have to be generated, for example in the drivelines of heavy vehicles such as trucks. To achieve an axially compact coupling assembly design it is advantageous if the linear driving mechanism is arranged in such a way that the longitudinal axis of same intersects the axis of rotation of the friction coupling at a distance. The coupling assembly thus features a high performance density while at the same time being small in size, thereby alleviating packaging concerns.

The characteristic that the two coupling parts can be coupled to one another means that the friction coupling is actuated in such a way that torque is transmitted between the first coupling part and the second coupling part. More particularly, this characteristic also refers to intermediate positions between the open position in which the two coupling parts can freely rotate relative to one another and the closed position in which the two coupling parts jointly rotate around the axis of rotation. At least indirect support of the first ring relative to a fixed component means that support can be provided by arranging further components in between. For example, an axial bearing can be arranged between the first ring and the fixed component. Between the two rings, there can be provided balls, for example, via which the two rings axially support one another. It is proposed that at least one of the two rings is connected in respect of drive to the linear driving mechanism in such a way that, when the linear driving mechanism is actuated, the one ring is rotated relative to the other ring. "At least one of the first and second rings" means that, according to a first possibility, the linear driving mechanism acts only on one of the first and second rings in the rotational sense, whereas the other ring is held in a rotationally fixed condition. A further possibility consists in that the linear driving mechanism, when actuated, acts on both rings simultaneously and rotate same relative to one another. According to one exemplary embodiment wherein the linear driving mechanism acts on only one of the rings, the axially supported first ring, which can also be referred to as a supporting ring, is held in a rotationally fixed condition, whereas the axially displaceable ring, which can also be referred to as a setting ring, is rotatable by the linear driving mechanism. However, a reversed situation is also possible according to which the supporting ring is loaded in the direction of rotation by the linear driving mechanism, whereas the setting ring is rotationally fixed relative to the supporting ring.

In one exemplary configuration, the linear driving mechanism comprises a substantially translatorily movable force transmitting element which is connected to the at least one ring, substantially translatory mechanism that, depending on the embodiment, the force transmitting element, in addition to the translatory movement, can also carry out slight pivot movements. The connection between the force transmitting element and the at least one ring is such that the substantially linear movement of the force transmitting element is converted into a rotational movement of the at least one ring. The force application direction of the force transmitting element extends at a distance relative to the axis of rotation, with the distance of the line of force from the axis of rotation determining the lever arm and thus the generatable torque of the axial setting device. The greater the distance of the line of force from the axis of rotation, the greater the torque which can be transmitted to the at least one ring and, respectively, the axial force generated by the second ring.

According to one exemplary configuration, the linear driving mechanism comprises a piston-cylinder unit whose piston is connected to the force transmitting element. Said piston-cylinder unit can comprise a hydraulic or a pneumatic piston cylinder, and in one exemplary configuration, a pneumatically operated membrane cylinder. The hydraulic or pneumatic piston-cylinder units are preferably of the single-action type, but in certain applications they can also be of the double-action type. An exemplary advantage of the hydraulic or pneumatic piston-cylinder unit consists in that they can, optionally, be integrated into an already existing hydraulic circuit or pneumatic circuit of the motor vehicle.

According to an alternative second embodiment, the linear driving mechanism comprises a linear electric drive. The linear electric drive can be a synchronous or an asynchronous machine.

According to a first possibility, the force transmitting element can be provided in the form of a coupling rod which is articulatably connected to the at least one ring on one side and to the output part of the piston-cylinder unit on other side. The articulated connection can be achieved by ball heads for example. According to a second possibility it is proposed that the force transmitting element is provided in the form of a toothed rack which, for force transmitting purposes, engages a toothed segment at the at least one rotatable ring, with the teeth of the toothed rack engaging the teeth of the toothed segment, so that a translatory movement of the toothed rack effects the rotation of the at least one ring.

According to an exemplary arrangement, there is provided a spring mechanism which acts against the force application direction of the force transmitting element. The spring mechanism ensures that the force transmitting element is returned into its starting position when the linear driving mechanism is deactivated. When the linear driving mechanism is switched on, the force transmitting element is moved against the force of the spring mechanism, so that the at least one ring is rotated, with the axial setting device generating an axial force. When the linear driving mechanism is switched off, the force transmitting element and thus the at least one ring are returned into their starting position, so that the two rings axially approach one another again, as a result of which the axial force is reduced.

In one exemplary configuration, at least one of the two rings comprises circumferentially extending grooves, respectively ramps, with variable depths in the form of a setting contour via which the two rings are at least indirectly axially supported relative to one another. "At least indirectly" means in the context of this application that the two rings are able to support one another in a direct way, for example via ramp-like tracks which are in surface contact with one another. However, the two rings can also be axially supported relative to one another via balls which are guided in ball grooves in the form of tracks. Such an embodiment is also referred to as a ball ramp assembly. The first ring comprises circumferentially extending first ball grooves and the second ring circumferentially extending second ball grooves. In a plan view of the end faces, the first and the second ball grooves comprise depths which decrease in the same circumferential direction, and in each pair consisting of a first and an opposed ball groove, there is received a ball via which the two rings are axially supported relative to one another. As an alternative to the embodiment in the form of a ball ramp assembly, the two rings can also be provided in the form of ramp discs. Between the ramp discs there are preferably arranged cylinder rollers via which the ramp discs are axially supported relative to one another.

According to one exemplary embodiment, the first coupling part comprises a coupling hub, with the axial setting device being arranged coaxially relative to the coupling hub. The second coupling part may be provided in the form of a coupling carrier which is positioned coaxially on the outside relative to the coupling hub and which is rotatable relative to the coupling hub around the axis of rotation. More particularly, it is proposed that the friction coupling is provided in the form of a multi-plate coupling, with the first coupling part comprising an inner plate carrier to which inner plates are connected in rotationally fixed and axially movable way, with the second coupling part comprising an outer plate carrier to which outer plates are connected in a rotationally fixed and axially movable way.

In another exemplary arrangement, the first ring of the axial setting device is axially supported relative to the first coupling part and rotatably supported thereto around the axis of rotation. Furthermore, there is provided an anti-rotation mechanism which prevents the first ring from rotating relative to a fixed component, for example a housing. The second ring is connected to the force transmitting mechanism and, upon rotation as a result of the axial setting device being actuated, it moves axially towards the friction coupling, so that the friction coupling is loaded in the closing sense.

Between the second ring of the axial setting device and the friction coupling there may be provided an axially movable pressure plate for loading the friction coupling. The pressure plate comprises an outer flange portion for loading the friction coupling as well as an inner flange portion which is acted upon by the second ring of the axial setting device. To achieve an axially compact design, it is advantageous if the inner flange portion is axially offset relative to the outer flange portion, more particularly in such a way that the inner flange portion, at least partially, is arranged so as to axially overlap with the friction coupling. Radially inside the inner plate carrier there may be formed an annular chamber which receives the inner flange portion of the pressure plate. As a result of this design, the axial setting device can be arranged close to the friction coupling, so that, overall, there is obtained an axially short unit which, due to the linear drive, is able to generate a high coupling moment.

BRIEF DESCRIPTION OF THE DRAWINGS

Exemplary embodiments of the disclosure will be explained below with reference to the drawings wherein.

DETAILED DESCRIPTION

Figure 1:
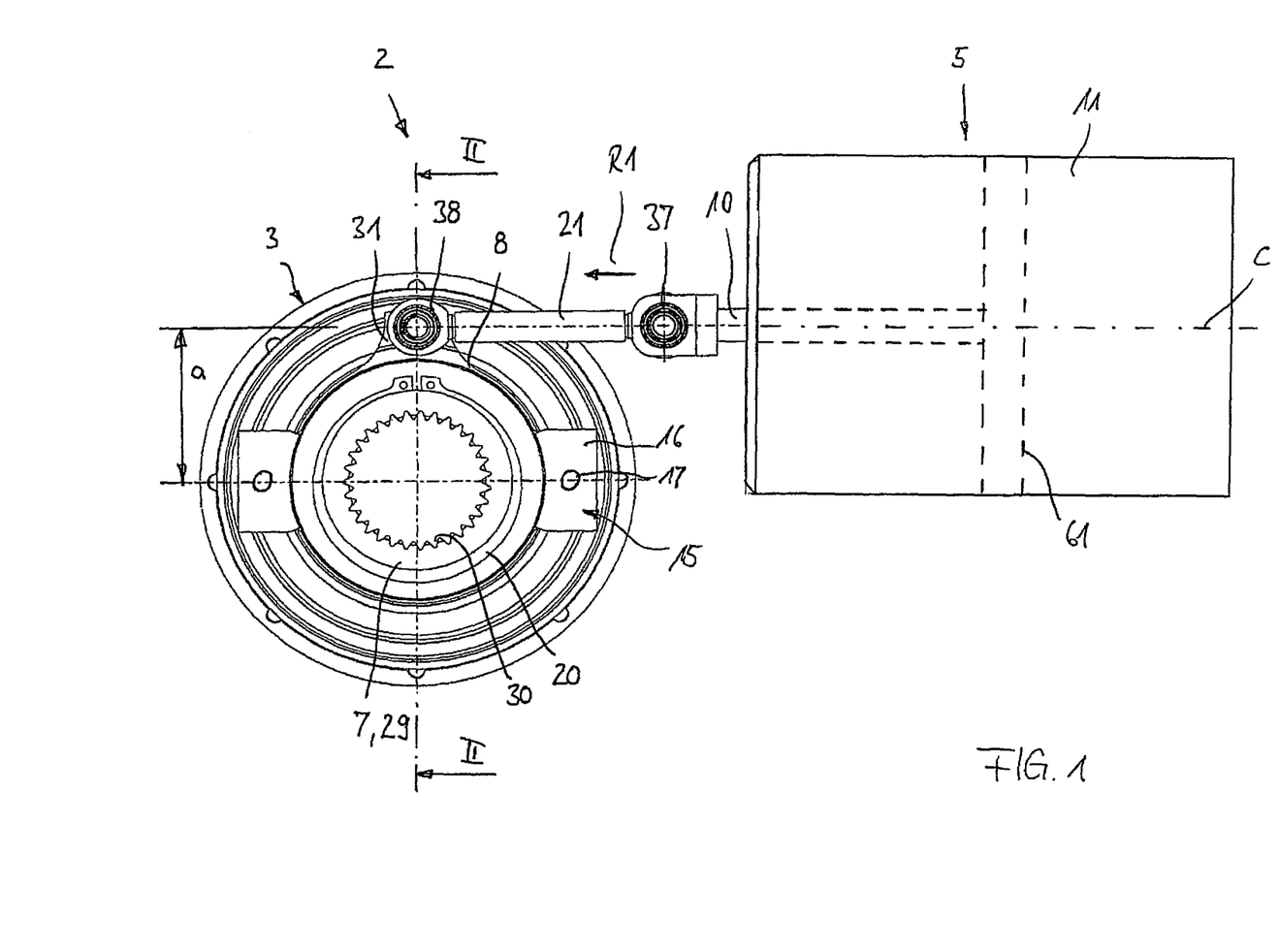
FIG. 1 shows an inventive coupling assembly in a first embodiment in an axial view, having a friction coupling and an axial setting device.
Figure 2:
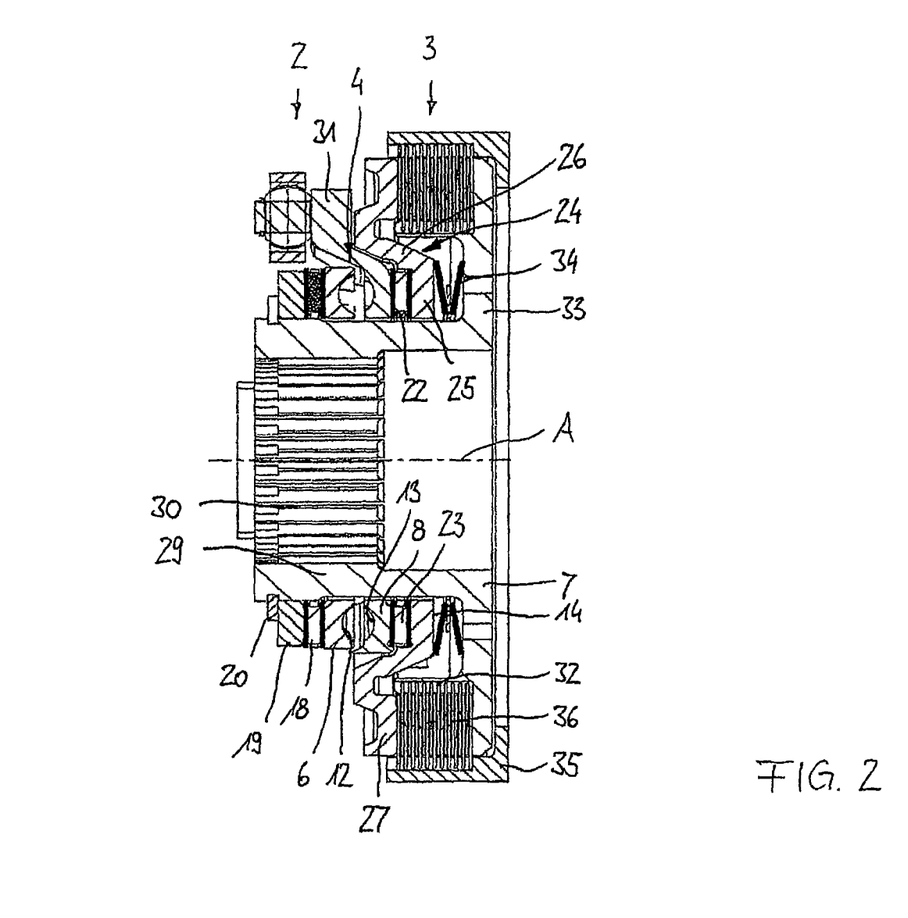
FIG. 2 shows the coupling assembly according to sectional line II-II of FIG. 1.

FIGS. 1 and 2, which will be described jointly below, show an inventive axial setting device 2 in a first embodiment which serves to actuate a friction coupling 3. The entire unit comprising the axial setting device 2 and the friction coupling 3 can also be referred to as a coupling assembly. The axial setting device 2 comprises a ball ramp assembly 4 and a linear driving mechanism 5 for actuating the ball ramp assembly 4. The ball ramp assembly 4 comprises a first ring 6 which is indirectly axially supported relative to the first coupling part 7 of the friction coupling and can therefore also be referred to as a supporting ring 6, as well as a second ring 8 which is indirectly axially supported relative to the first ring 6 and is axially movable relative to same. As is particularly obvious from FIG. 2, the two rings 6, 8, on their respective end faces facing one another, comprise a plurality of circumferentially distributed and circumferentially extending ball grooves 12, 13 whose depths vary in opposite directions. In each pair of opposed ball grooves 12, 13, there is received a ball via which the two rings 6, 8 are axially supported relative to one another. The balls are located in a plane which differs from the sectional plane as shown and are therefore not visible. In an axial direction, between the two rings 6, 8, there can be provided an annular-disc-shaped cage with a plurality of circumferentially distributed windows. In each window there is received one of the balls, which balls are thus held in a circumferential direction in a defined position relative to one another.

In the present embodiment, the first ring is prevented by an anti-rotation mechanism 15 from rotating around the axis of rotation A, whereas the second ring 8 is rotatingly driveable by the linear driving mechanism relative to the first ring 6 to a limited extent. To prevent any rotation, the first ring 6 comprises two radially outwardly extending projections 16 which, via a pin 17, can be connected in a form-locking way to a fixed component (not shown). However, any other suitable anti-rotation mechanisms are also conceivable, for instance a toothing with a fixed component. It can be seen that the first ring 6 is axially supported by an axial bearing 18 relative to a supporting plate 19 which, in turn, is axially supported by a securing ring 20 relative to the first coupling part 7. The second ring 8 which can also be referred to as a setting ring, on its rear face, comprises a radial pressure face 22 which, via an intermediate axial bearing 23, axially loads a pressure plate 24. The axial bearing 23 can be provided in the form of a needle bearing. It can be seen that the pressure plate 24 comprises a flange-shaped inner portion 25, a transition portion 26 which extends at an angle relative to the axis of rotation A, and an outer flange portion 27 which adjoins the transition portion 26 on the radial outside, for loading the friction coupling 3.

The first coupling part 7 comprises a sleeve-shaped coupling hub 29 with longitudinal teeth 30 into which it is possible, for torque transmitting purposes, to insert a drive shaft in a rotationally fixed way, a radial portion 33 and a sleeve-shaped inner plate carrier 32 to which there are connected inner plates in a rotationally fixed and axially displaceable way. Between the radial portion 33 of the first coupling part 7 and an opposed supporting face 14 of the pressure plate 24 there are effectively inserted a spring mechanism 34 which loads the pressure plate 24 away from the radial portion 33. The spring mechanism 34 is provided in the form of a pair of plate springs, but other spring mechanisms, for example spiral springs, can also be used. In addition to the first coupling part 7, the friction coupling 3 comprises a second coupling part 35 which, relative to the first coupling part 7, can be rotated around the axis of rotation A. The second coupling part 35 is provided in the form of an outer plate carrier to which there are connected outer plates in a rotationally fixed and axially movable way. The inner plates and the outer plates are arranged so as to axially alternate and jointly form a plate package 36.

The linear driving mechanism 5 comprises a piston-cylinder unit 11 and a force transmitting element 21 connected to the piston rod 10 of the piston-cylinder unit 11. It can seen in FIG. 1 that the force transmitting element 21 is provided in the form of a coupling rod which, at its ends, is articulatably connected at the piston rod 10 on the one end and at an outwardly projecting actuating lever 31 of the second ring 8 on the other end. For connecting the coupling rod 21 to the piston rod 10 on the one end and to the actuating lever 31 on the other end, there are provided ball joints 37, 38. The piston-cylinder unit 11 comprises a single-action hydraulic or pneumatic piston cylinder with a longitudinal axis C. A piston 61 of the piston-cylinder unit 11 is moveable within the cylinder.

The functioning mode of the axial setting device 2 and of the coupling assembly respectively is as follows. Under normal conditions the piston of the piston cylinder unit 11 is in a moved in condition and the two rings 6, 8 are arranged at the smallest possible distance from one another. While the piston-cylinder unit 11 is being actuated, the piston is moved out and transmits a setting force to the force transmitting element 21 which, substantially, moves translatorily in the force application direction R1 which extends at the distance (a) from the axis of rotation A. In this way, the second ring 8 is rotated relative to the first ring 6 which is held in a rotationally fixed way, so that the balls run in the ball grooves 12, 13 into regions of lower depth. The two rings 6, 8 are thus axially spread apart while the second ring 8 is displaced axially towards the friction coupling 3 against the spring force of the spring mechanism 34. When the piston-cylinder unit 11 is again switched off, the spring mechanism 34 pushes back the second ring 8 via the pressure plate 24 into the starting position, with the second ring 8 rotating itself back into its starting position.

Figure 3:
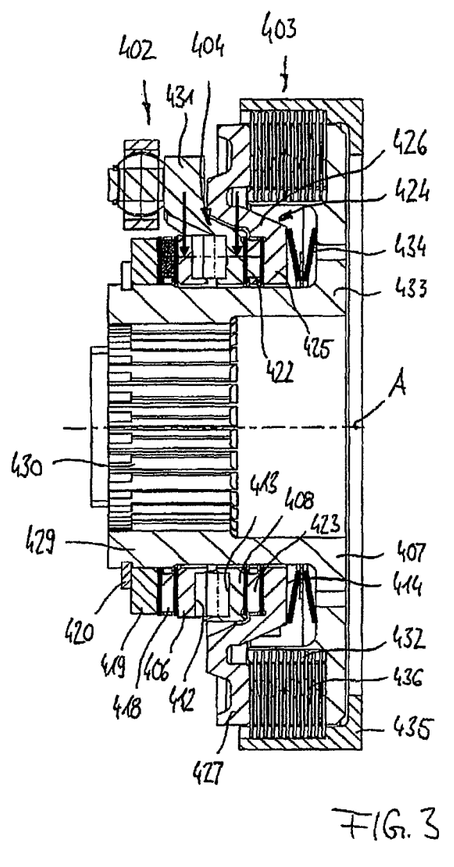
FIG. 3 shows an inventive coupling assembly in a second embodiment in a longitudinal section.
Figure 4:
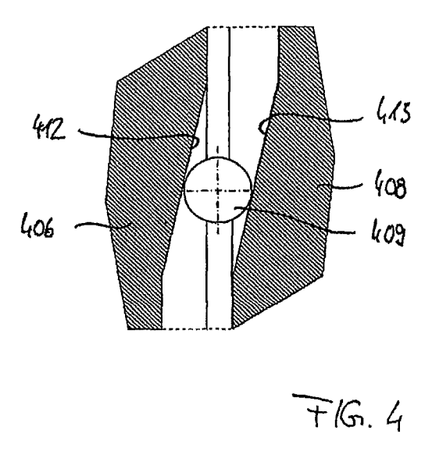
FIG. 4 shows the ramp assembly of FIG. 3 in the form of a detail in a circumferential section along sectional line IV-IV of FIG. 3.

FIGS. 3 and 4, which will be described jointly below, show an inventive coupling assembly with an axial setting device 402 and a friction coupling 403 in a second embodiment. The present axial setting device largely corresponds to that shown in FIGS. 1 and 2, which is the reason why, as far as their common features are concerned, reference is made to the above description, with identical components and those components which correspond to one another being provided with reference numbers increased by the figure 400. The only difference refers to the design of the ramp mechanism. In the present embodiment, the first ring 406 and the second ring 408 comprise ramp faces 412, 413 (instead of ball grooves) via which the two rings 406, 408 are axially supported relative to one another. The rolling-contact members are provided in the form of cylinder rollers 409 which are held between the ramp faces 412, 413. The functioning mode is analogous to the ball ramp assembly according to FIGS. 1 and 2. When the piston-cylinder unit is actuated, the second ring 408 is rotated relative to the rotationally fixed first ring 406, so that the cylinder rollers 409 run along the ramp faces 412, 413 in the regions of a smaller depth. The two rings 406, 408 are thus axially spread apart, with the second ring 408 being displaced towards the friction coupling 403 against the spring force of the spring mechanism 434. When the piston-cylinder unit is again switched off, the spring mechanism 434 pushes the second ring 408 via the pressure plate 424 again into the starting position, with the second ring 408 being rotated back into its starting position. For the sake of completeness it should be mentioned that a ramp assembly without cylinder rollers is also conceivable wherein the two opposed rings are directly axially supported relative to one another via their ramp faces.

Figure 5:
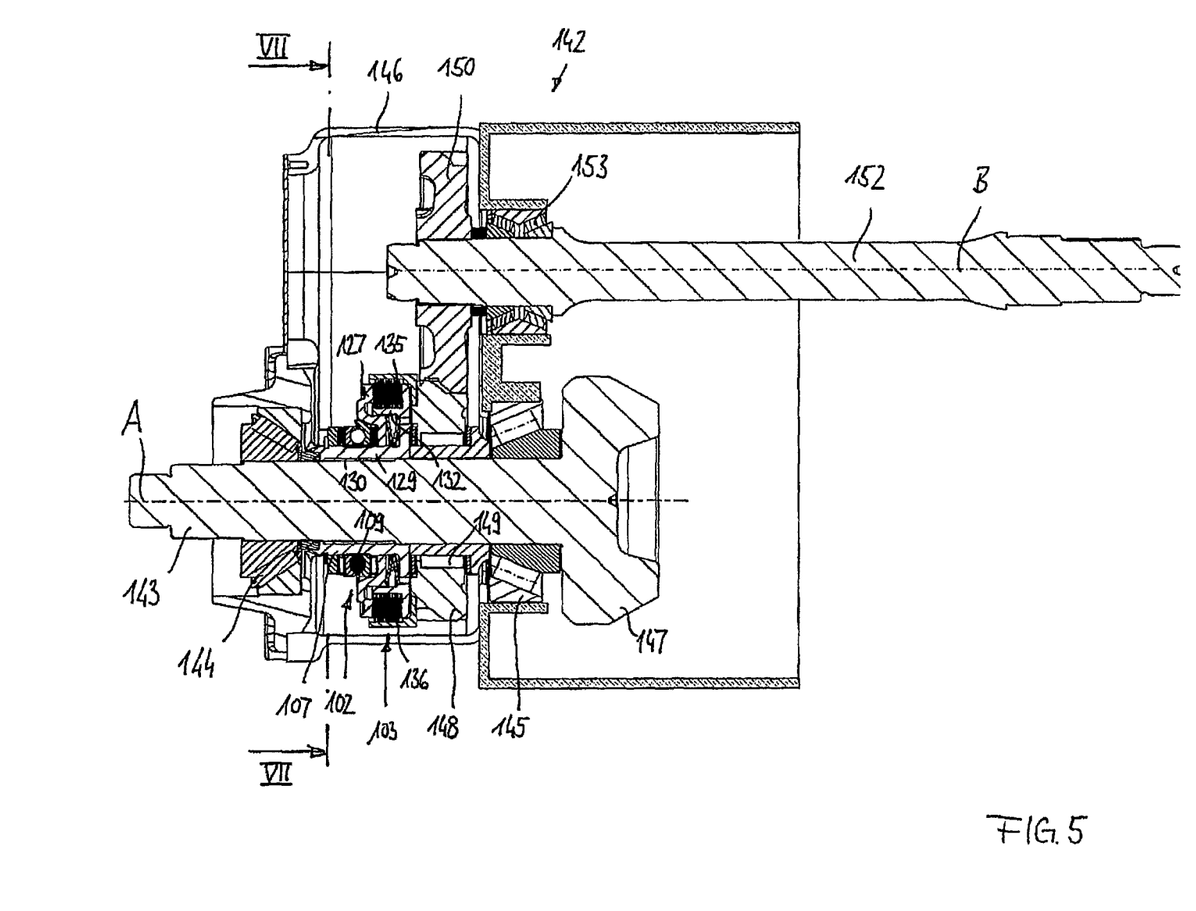
FIG. 5 shows an inventive coupling assembly in a third embodiment in a drive assembly in a longitudinal section.
Figure 6:
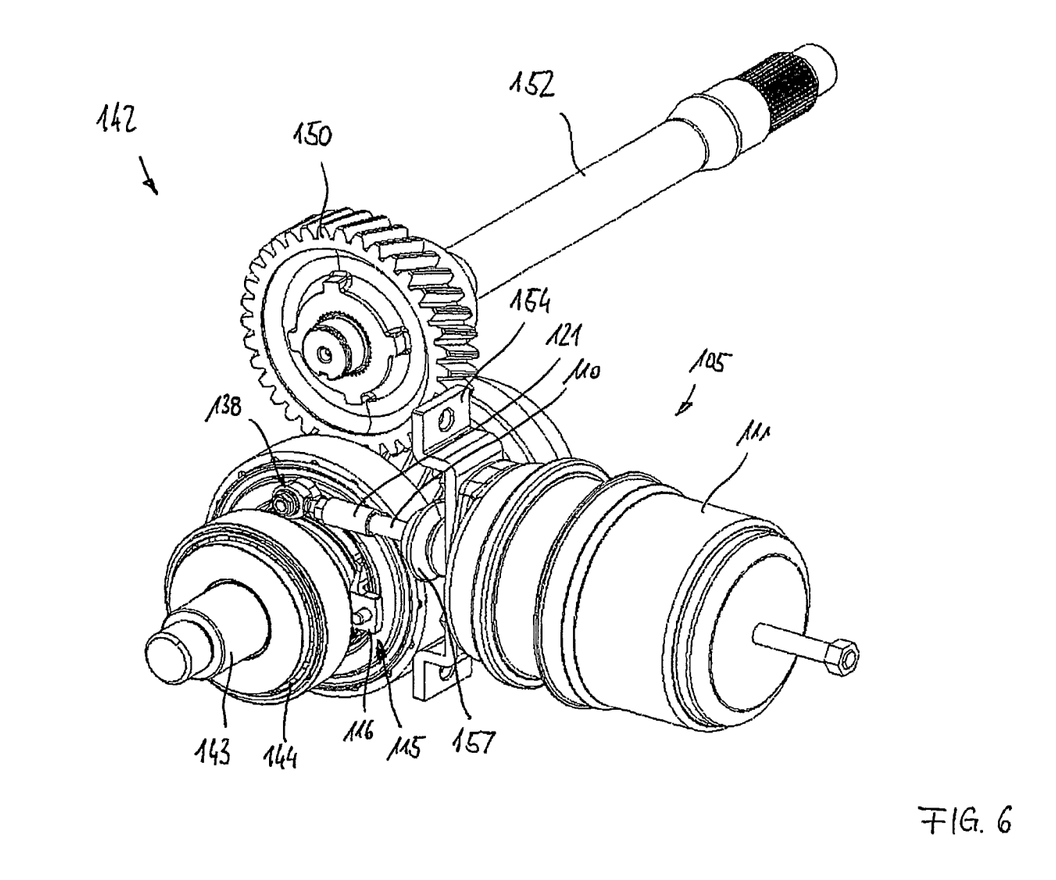
FIG. 6 shows the drive assembly according to FIG. 5 in a perspective view, without housing parts.
Figure 7:
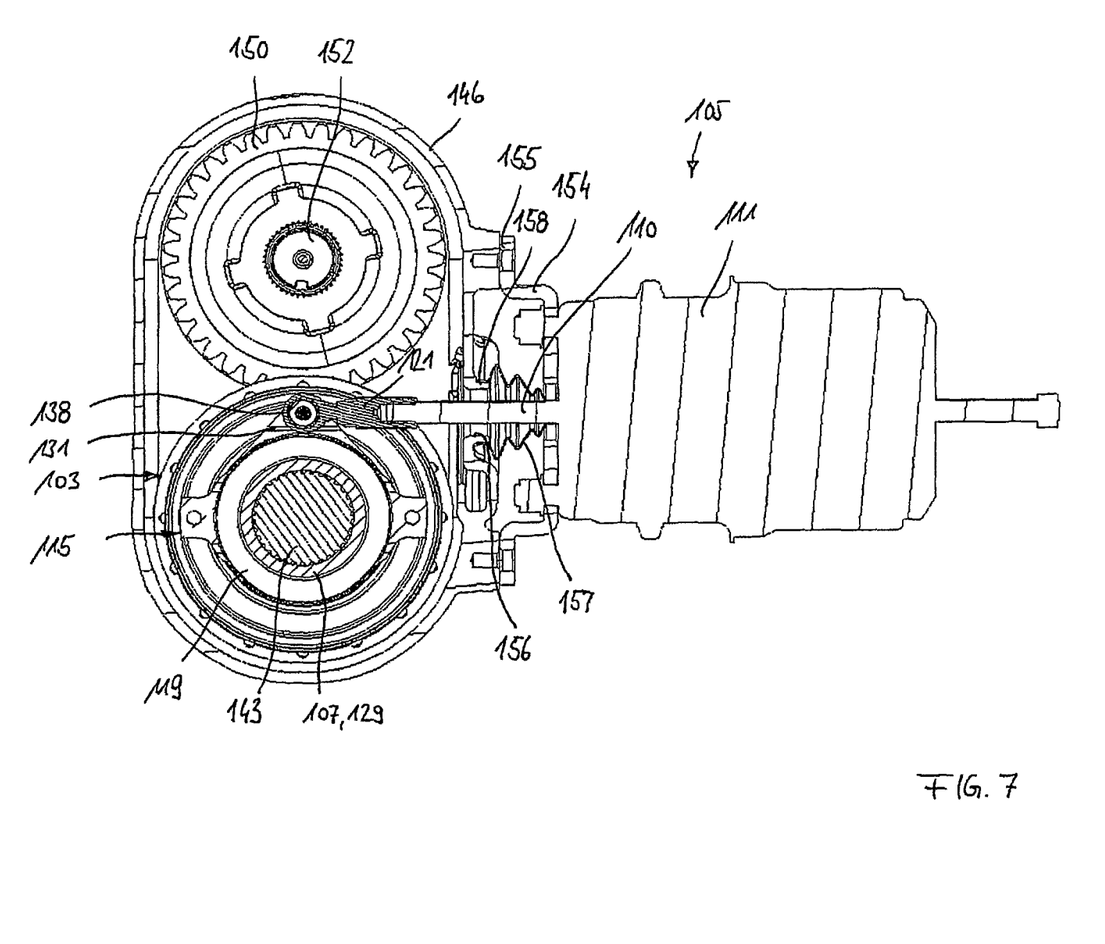
FIG. 7 shows the drive assembly along sectional line VII-VII of FIG. 5 with the inventive axial setting device.

FIGS. 5 to 7, which will be described jointly below, show a gearbox assembly 142 with an inventive coupling assembly with an axial setting device 102 for actuating the friction coupling 103 of a third embodiment. The present coupling assembly largely corresponds to that shown in FIGS. 1 and 2, which is the reason why, as far as their joint features are concerned, reference is made to the above description. Identical components or components corresponding to one another are provided with reference numbers increased by the figure 100 relative to the embodiment according to FIG. 1 and FIG. 2 respectively. Below, there will first follow a description of the special features of the present axial setting device; thereafter, the mode of functioning of the gearbox assembly as a whole will be explained.

The only substantial difference of the axial setting device 102 in the present embodiment refers to the design of the linear driving mechanism 105 which, in the present embodiment, comprises a piston-cylinder unit 111 which is provided in the form of a pneumatically operated membrane cylinder. The special feature of the membrane cylinder is that the piston rod 110 is able to carry out slight pivot movements, which is the reason why the force transmitting element 121 can be provided in the form merely of an attaching piece which is firmly connected to the end of the piston rod 110 and whose second end is connected by the ball joint 138 to the actuating lever 131 of the second ring 108. A coupling rod, such as is shown in the embodiment illustrated in FIGS. 1 and 2, is not required in the present embodiment. In all other respects, the design and mode of functioning of the axial setting device 102 correspond to those of the first embodiment, so that, to that extent, reference is made to the above description.

The inventive coupling assembly which comprises the axial setting device 102 and the friction coupling 103 forms part of the drive assembly 142 which serves to optionally connect a second driveline to a first driveline. For this purpose, the drive assembly 142 comprises a first driveshaft 143 which can be driven so as to rotate around the axis of rotation A and which, via two rolling contact bearings 144, 145, is rotatably supported in a gearbox housing 146. The first driveshaft 143 is provided in the form of a driving journal which, at its end, comprises a bevel gear 147 for driving a differential drive (not illustrated). The coupling hub 129 is connected to the first driveshaft 143 in a rotationally fixed way by a splined connection, so that the inner plate carrier 132 rotates jointly with the first driveshaft 143 around the axis of rotation A. The second coupling part 135 is firmly connected, by welding for instance, to a first gear 148 which, by a radial bearing 149, is rotatably supported on the first driveshaft 143. The first gear 148 engages the second, larger gear 150 which is connected to a second driveshaft 152 in a rotationally fixed way. The second driveshaft 152 is supported in the gearbox housing 146 by a rolling contact bearing 153 so as to rotate around a second axis B, and serves to drive a further driving axle of the motor vehicle (not shown). FIG. 5 also shows the balls 109 which are held between the first and the second ring 106, 108. The first ring 106 is prevented by an anti-rotation mechanism 115 from rotating around the axis of rotation, whereas the second ring 108 is rotatingly driveable.

When the friction coupling 103 is open, the first coupling part 107 can freely rotate relative to the second coupling part 135, so that no torque is transmitted between said coupling parts 107, 135. By actuating the linear driving mechanism 105 which, in the present embodiment, is provided in the form of a membrane cylinder, the second ring 108 of the axial setting device 102 is rotated relative to the first ring 106, so that the plate package 136 is loaded and the coupling 103 is closed. In this way, torque is transmitted from the first driveshaft 143 to the second driveshaft 152.

As is particularly obvious in FIG. 7, a carrier element 154 which, via a bolted connection 155, is connected to the housing 146, is provided for fixing the piston-cylinder unit 111. The housing 146 comprises an aperture 156 which is passed by the piston rod 110. In order to seal the housing 146 relative to the environment, there is provided a membrane seal 157 one end of which is positioned on the piston rod 110, with its opposite second end being positioned on a sleeve projection 158 of the housing 146.

Figure 8:
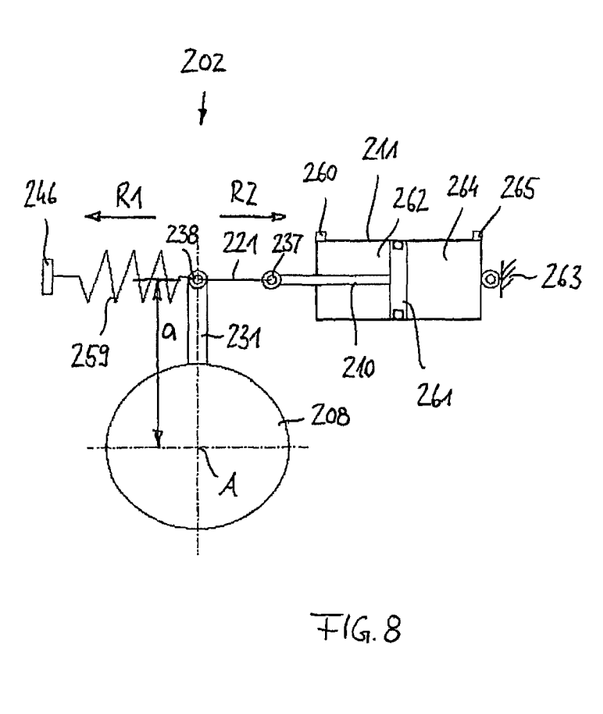
FIG. 8 shows an axial setting device for an inventive coupling assembly in a fourth embodiment giving the design principles in a plan view.
Figure 9:
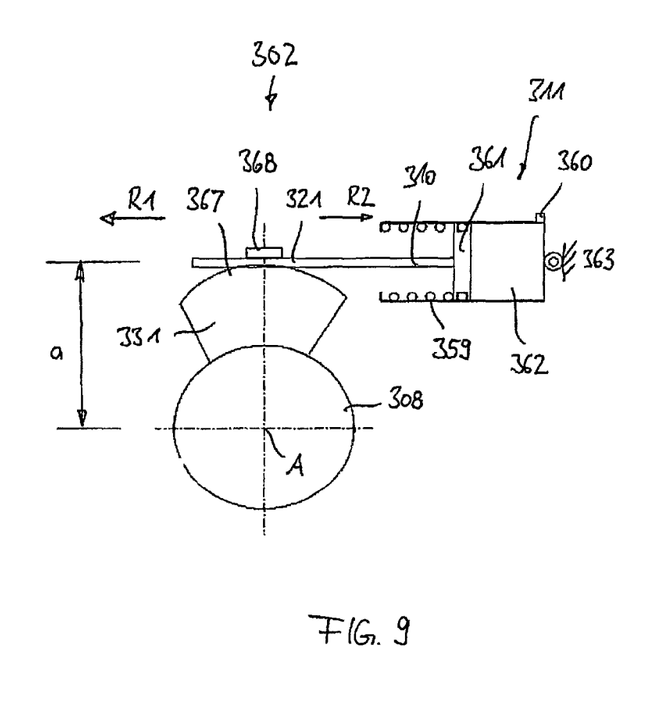
FIG. 9 shows an axial setting device for an inventive coupling assembly in a fifth embodiment giving the design principles in a plan view.

FIGS. 8 and 9 each show the design principles of further embodiments of axial setting devices for inventive coupling assemblies. For the sake of completeness, it should be mentioned that the ramp assembly shown only schematically in FIGS. 9 and 10 can comprise each one of the above-mentioned embodiments according to FIGS. 1 to 8.

The design and mode of functioning of the axial setting device 202 according to FIG. 8 largely corresponds to those shown in FIGS. 1 to 7, so that, to that extent, reference is made to the above description. Identical components or components corresponding to one another have been given reference numbers which relative to the embodiment according to FIGS. 5 to 7, have again been increased the number figure 100. The present embodiment is characterised in that the piston-cylinder unit 211 acts as a traction element. Under normal conditions, i.e. when the piston-cylinder unit 211 is de-activated, the actuating lever 231 of the second ring 8 is loaded by the tensile spring 259 anti-clockwise into a rotational position in which the second disc 208 is axially positioned at the shortest distance from the first disc 206. The tensile spring 259 is attached to a fixed component, for instance a housing 246 and applies to the actuating lever 231 a force whose operating direction has been given the reference symbol R1. To close the friction coupling 203 and, respectively, operate the axial setting device 202, the pneumatic piston-cylinder unit 211 is pressure loaded via the connection 260, so that the piston 261 is loaded into a second direction R2 which is opposed to the first direction R1. Via the force transmitting element 221, the piston rod 210 connected to the piston 261 pulls the actuating lever 231 clockwise, so that the second ring 208 is rotated relative to the first ring 206 and so that the friction coupling 203 is loaded by the pressure plate 224. In order to return the piston 238 of the piston-cylinder unit into the starting position, the connection 260 is opened, so that the pressure in the chamber 262 decreases and the actuating lever 231 is pulled by the tensile spring 259 into the starting position. In principle, it is also conceivable that the returning movement of the actuating lever 231 is accelerated in that, at the connection 265 and thus in the chamber 264, there is generated an excess pressure which loads the piston 261 in the direction R1. The piston-cylinder unit 211 is attached to a fixed component 263 which can be a housing component for example. An alternative to actuating the piston cylinder unit 211 can consist in that a vacuum is generated in the second chamber 264 at the connection 265, so that the piston 261 is moved in the direction R2.

FIG. 9 shows the design principles of an axial setting device 302 for an inventive coupling assembly in a further embodiment. The design and mode of functioning largely correspond to those shown in FIGS. 1 to 7, so that, to that extent, reference is made to the above description. Identical components or components corresponding to one another have been given reference numbers which have again been increased by the number figure 100. The characteristic feature of the present embodiment comprises that the transmission of force from the piston 361 to the second ring 308 is effected by a toothed assembly, with the force transmitting element 321 being provided in the form of a toothed rack which cooperates with the corresponding toothed segment 367 at the outer circumferential face of the actuating lever 331. There is provided a counter holding device 368 against which the toothed rack 321, by its contact face, is supported in a radial direction relative to the axis of rotation A.

The piston-cylinder unit 311 is provided in the form of a single-action pressure cylinder which is attached to a fixed component 363. By applying a pressure to the pressure connection 360, the piston 361 is moved against the force of the spring mechanism 359 in direction R1, with the force application direction of the piston rod 10 and of the toothed segment 321 respectively extending at a distance (a) relative to the axis of rotation, so that torque is applied anti-clockwise to the toothed segment 367 and the second ring 308 connected thereto. For de-activating purposes, the pressure connection 360 is released and the piston 361 is moved in direction R2 into its starting position by the force of the spring mechanism 359. The second ring 308 is rotated in a clockwise direction into its starting position and assumes a position wherein the two rings 306, 308 are positioned at a minimum axial distance from one another. In this condition, the friction coupling 303 is again open.

All the above-described coupling assemblies are advantageous in that they are able to transmit relatively high torque values because the linear driving mechanism used for the axial setting device are able to generate relatively high forces. The inventive coupling assemblies thus are particularly suitable for applications wherein high torque values have to be transmitted, such as the driveline of trucks for optionally connecting a further driving axis. A further advantage is in that, due to the use of axial setting devices with linear driving mechanism, the inventive coupling assemblies are of a relatively compact construction. The use of piston-cylinder units is particularly advantageous as they can easily be integrated into an existing hydraulic or pneumatic system.

What is claimed is:

1. A coupling assembly for connecting an optionally drivable secondary driveline to a permanently driven primary driveline, comprising:
   a friction coupling with a first coupling part, a second coupling part, a pressure plate and a plate package, wherein the first coupling part and the second coupling part are rotatable around an axis of rotation and, by axial forces loading the plate package, can be coupled to one another for transmitting torque; and
   an axial setting device for actuating the friction coupling, wherein the axial setting device comprises a first ring and a second ring which is axially supported at least indirectly relative to the first ring and which, when one of the first and the second rings is rotated relative to the other one of the first and second rings around the axis of rotation, is axially displaceable,
   wherein the first ring and the second ring of the axial setting device are rotatingly supported relative to the first coupling part around the axis of rotation by a respective first axial bearing and second axial bearing,
   wherein the first ring and the second ring each include a ramp face, the pressure plate having a recess axially receiving a portion of the second ring such that the pressure plate radially surrounds the ramp face of the second ring;
   wherein said first axial bearing is axially supported against the first coupling part in a first axial direction,
   wherein said second axial bearing is interposed between the second ring and the pressure plate such that the pressure plate loads the plate package upon axial movement of the second ring in a second axial direction,
   wherein the plate package of the friction coupling is axially supported against the first coupling part in said second axial direction,
   wherein, for rotating the at least one of the two rings, there is provided a linear driving mechanism; and
   wherein the linear driving mechanism acts on one of the first and second rings so as to rotate said one of the first and second rings, whereas another one of the first and second rings is held so as to be rotationally fixed relative to a stationary component.

2. A coupling assembly according to claim 1, wherein the linear driving mechanism comprises a longitudinal axis, wherein the linear driving mechanism is arranged in such a way that the longitudinal axis crosses the axis of rotation at a distance.

3. A coupling assembly according to claim 1, wherein at least one of the first and second rings of the axial setting device comprises a setting contour in a circumferential direction, wherein the setting contour is shaped in such a way that, upon rotation of the first and second rings relative to one another, the second ring is axially displaced.

4. A coupling assembly according to claim 1, wherein the first coupling part comprises a coupling hub, and wherein the axial setting device is arranged coaxially relative to the coupling hub.

5. A coupling assembly according to claim 1, wherein the pressure plate is arranged between the second ring of the axial setting device and the plate package of the friction coupling, said pressure plate being axially movable for loading the friction coupling.

6. A coupling assembly according to claim 1, wherein the pressure plate comprises an outer flange portion for loading the plate package of the friction coupling and an inner flange portion which is loaded by the axial setting device, wherein the inner flange portion is axially offset relative to the outer flange portion.

7. A coupling assembly according to claim 6, wherein the inner flange portion is arranged so as to overlap with the plate package of the friction coupling, and wherein the inner flange portion is arranged such that the second axial bearing at least partially overlaps with the plate package of the friction coupling.

8. A coupling assembly according to claim 6, wherein the inner flange portion is arranged so as to at least partially overlap with the plate package of the friction coupling.

9. A coupling assembly according to claim 1, wherein the linear driving mechanism comprises a translatorily movable force transmitting element which, for force transmitting purposes, is connected to at least one of the first and second rings.

10. A coupling assembly according to claim 9, wherein the linear driving mechanism comprises a piston-cylinder unit with a piston, wherein the piston is connected to the force transmitting element.

11. A coupling assembly according to claim 10, wherein the piston-cylinder unit comprises a hydraulic cylinder.

12. A coupling assembly according to claim 10, wherein the piston-cylinder unit comprises a pneumatic cylinder which is provided in the form of a pneumatically operated membrane cylinder.

13. A coupling assembly according to claim 9, wherein the force transmitting element is provided in the form of a coupling rod which is articulatably connected to the at least one ring.

14. A coupling assembly according to claim 9, wherein the force transmitting element is provided in the form of a toothed rack, wherein the at least one ring comprises a toothed segment which is engaged by the toothed rack.

15. A coupling assembly according to claim 9, wherein there is provided a spring mechanism which acts against a force direction of the force transmitting element.

16. A coupling assembly according to claim 1, wherein at least one of the first and second rings comprises circumferentially extending tracks with variable depths via which the first and second rings are at least indirectly axially supported relative to one another.

17. A coupling assembly according to claim 1, wherein the first coupling part comprises a hub and a radial portion integrally connected to the hub, wherein at least the first axial bearing, the first ring, the second ring, the second axial bearing and the pressure plate are arranged on said hub.

18. A coupling assembly according to claim 17, wherein the first axial bearing is axially supported against the hub in the first axial direction, and wherein the plate package is axially supported against the radial portion in the opposed second axial direction.

19. A coupling assembly according to claim 1, further comprising a first driveshaft drivingly connected to the first coupling part, and a second driveshaft drivingly connected to the second coupling part, wherein the second coupling part is firmly connected to a first gear, said first gear engages a second gear, and said second gear is connected to the second driveshaft in a rotationally fixed way.

20. A coupling assembly according to claim 19, wherein the first gear is radially supported on the first driveshaft by a radial bearing so as to be rotatable relative to the first driveshaft.

21. A coupling assembly for connecting an optionally drivable secondary driveline to a permanently driven primary driveline, comprising:

a friction coupling with a first coupling part, a second coupling part, a pressure plate and a plate package, wherein the first coupling part and the second coupling part are rotatable around an axis of rotation and, by axial forces loading the plate package, can be coupled to one another for transmitting torque, wherein the first coupling part is fixedly mounted on, so as to not be rotatable with respect to, a driveshaft or housing thereof; and an axial setting device for actuating the friction coupling, wherein the axial setting device comprises a first ring and a second ring which is axially supported at least indirectly relative to the first ring and which, when one of the first and the second rings is rotated relative to the other one of the first and second rings around the axis of rotation, is axially displaceable, wherein the first ring and the second ring of the axial setting device are rotatingly supported relative to the first coupling part around the axis of rotation by a respective first axial bearing and second axial bearing, wherein said first axial bearing is axially supported against the first coupling part in a first axial direction, wherein said second axial bearing is interposed between the second ring and the pressure plate such that the pressure plate loads the plate package upon axial movement of the second ring in a second axial direction, wherein the plate package of the friction coupling is axially supported against the first coupling part in said second axial direction, wherein, for rotating the at least one of the two rings, there is provided a linear driving mechanism; and wherein the linear driving mechanism acts on one of the first and second rings so as to rotate said one of the first and second rings, whereas another one of the first and second rings is held so as to be rotationally fixed relative to a stationary component.

22. A coupling assembly for connecting an optionally drivable secondary driveline to a permanently driven primary driveline, comprising:

a friction coupling with a first coupling part, a second coupling part, a pressure plate and a plate package, wherein the first coupling part and the second coupling part are rotatable around an axis of rotation and, by axial forces loading the plate package, can be coupled to one another for transmitting torque; and an axial setting device for actuating the friction coupling, wherein the axial setting device comprises a first ring and a second ring which is axially supported at least indirectly relative to the first ring and which, when one of the first and the second rings is rotated relative to the other one of the first and second rings around the axis of rotation, is axially displaceable, wherein the first ring and the second ring of the axial setting device are rotatingly supported relative to the first coupling part around the axis of rotation by a respective first axial bearing and second axial bearing, wherein said first axial bearing is axially supported against the first coupling part in a first axial direction, wherein the pressure plate comprises an outer flange portion for loading the plate package of the friction coupling and an inner flange portion which is loaded by the axial setting device, wherein the inner flange portion is axially offset relative to the outer flange portion, wherein the plate package is arranged so as to fully overlap with at least one of the inner flange portion and the second axial bearing, wherein said second axial bearing is interposed between the second ring and the pressure plate such that the pressure plate loads the plate package upon axial movement of the second ring in a second axial direction,
wherein the plate package of the friction coupling is axially supported against the first coupling part in said second axial direction,
wherein, for rotating the at least one of the two rings, there is provided a linear driving mechanism; and
wherein the linear driving mechanism acts on one of the first and second rings so as to rotate said one of the first and second rings, whereas another one of the first and second rings is held so as to be rotationally fixed relative to a stationary component.

* * * * *